(12) United States Patent
Osborn et al.

(10) Patent No.: US 11,908,262 B2
(45) Date of Patent: Feb. 20, 2024

(54) TOKEN BASED SECURE ACCESS TO A LOCKER SYSTEM

(71) Applicant: Capital One Services, LLC, McLean, VA (US)

(72) Inventors: Kevin Osborn, Newton Highlands, MA (US); Matt J. Oliver, Whitney, TX (US); Lin Ni Lisa Cheng, New York, NY (US)

(73) Assignee: Capital One Services, LLC, McLean, VA (US)

( * ) Notice: Subject to any disclaimer, the term of this patent is extended or adjusted under 35 U.S.C. 154(b) by 11 days.

(21) Appl. No.: 17/530,273

(22) Filed: Nov. 18, 2021

(65) Prior Publication Data

US 2023/0154260 A1 May 18, 2023

(51) Int. Cl.
*G07C 9/22* (2020.01)
*G07C 9/00* (2020.01)
*H04L 9/32* (2006.01)
*H04L 9/00* (2022.01)

(52) U.S. Cl.
CPC ........... *G07C 9/22* (2020.01); *G07C 9/00309* (2013.01); *G07C 9/00896* (2013.01); *H04L 9/3213* (2013.01); *H04L 9/3242* (2013.01); *H04L 9/50* (2022.05); *H04L 2209/80* (2013.01)

(58) Field of Classification Search
CPC .. G07C 9/22; G07C 9/00309; G07C 9/00896; H04L 9/3213; H04L 9/3242; H04L 9/50
See application file for complete search history.

(56) References Cited

U.S. PATENT DOCUMENTS

| | | | |
|---|---|---|---|
| 9,842,351 B2 | 12/2017 | Enahan et al. | |
| 2014/0035721 A1 | 2/2014 | Heppe et al. | |
| 2015/0135279 A1 | 5/2015 | Hayat | |
| 2016/0116510 A1* | 4/2016 | Kalous | G07C 9/00571 340/636.1 |
| 2017/0169422 A1 | 6/2017 | Ye et al. | |
| 2018/0336612 A1 | 11/2018 | Bullard, III et al. | |
| 2019/0311090 A1 | 10/2019 | Nishida et al. | |
| 2020/0104891 A1* | 4/2020 | Rule | G07C 9/00182 |
| 2020/0193375 A1 | 6/2020 | Santangeli et al. | |
| 2021/0078536 A1* | 3/2021 | Stitt | H04W 12/122 |

OTHER PUBLICATIONS

International Search Report directed to related International Application No. PCT/US22/80070, dated Feb. 22, 2023, 2 pages.

* cited by examiner

*Primary Examiner* — Nabil H Syed
(74) *Attorney, Agent, or Firm* — Sterne, Kessler, Goldstein & Fox P.L.L.C.

(57) ABSTRACT

Disclosed herein are system, method, and computer program product embodiments for providing secure access to a locker of a locker system based on a token that includes token data and a message authentication code (MAC) to authenticate the token data. The token data includes at least the unique locker identifier for the locker. The MAC can be generated using a secret key. The secret key can be obtained based on a unique derivation key associated with a master key. The locker system can determine whether the token is valid based on the token data, the MAC, and the secret key. In response to a determination that the token is valid, the locker system can send a signal to unlock the locker.

15 Claims, 6 Drawing Sheets

TOKEN BASED SECURE ACCESS TO A LOCKER SYSTEM

BACKGROUND

A transaction, such as an online purchase, may involve a monetary payment in exchange for goods or products. Once a buyer has purchased products or goods from a seller, the products or goods will be delivered to the buyer. Delivery of products and goods can be applicable to non-commercial applications too. Secure delivery of products and goods to a user who is authorized to pick up the products and goods can face many challenges.

BRIEF SUMMARY

Disclosed herein are system, apparatus, device, method and/or computer program product embodiments, and/or combinations and sub-combinations thereof for a token based secure access to a locker system, which can be used to deliver products and goods to a customer or a user who is authorized to pick up the products or goods.

In some examples, a locker system can include one or more locker banks, where each locker bank can include multiple lockers. Each locker bank can be identified by a unique locker bank identifier, and each locker in a locker bank can be identified by a unique locker identifier. The locker system also includes a memory configured to store a master key, a communication interface, and a processor coupled to the communication interface and the memory. The processor is configured to receive a token through the communication interface to unlock a locker. The token can include token data, and a message authentication code (MAC) to authenticate the token data. The token data includes at least the unique locker identifier for the locker. The MAC can be generated using a secret key. The secret key can be obtained based on a unique derivation key (UDK) associated with the master key. The processor can be further configured to determine whether the token is valid based on the token data, the MAC, and the secret key. In response to a determination that the token is valid, the processor can be configured to send a signal to unlock the locker.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
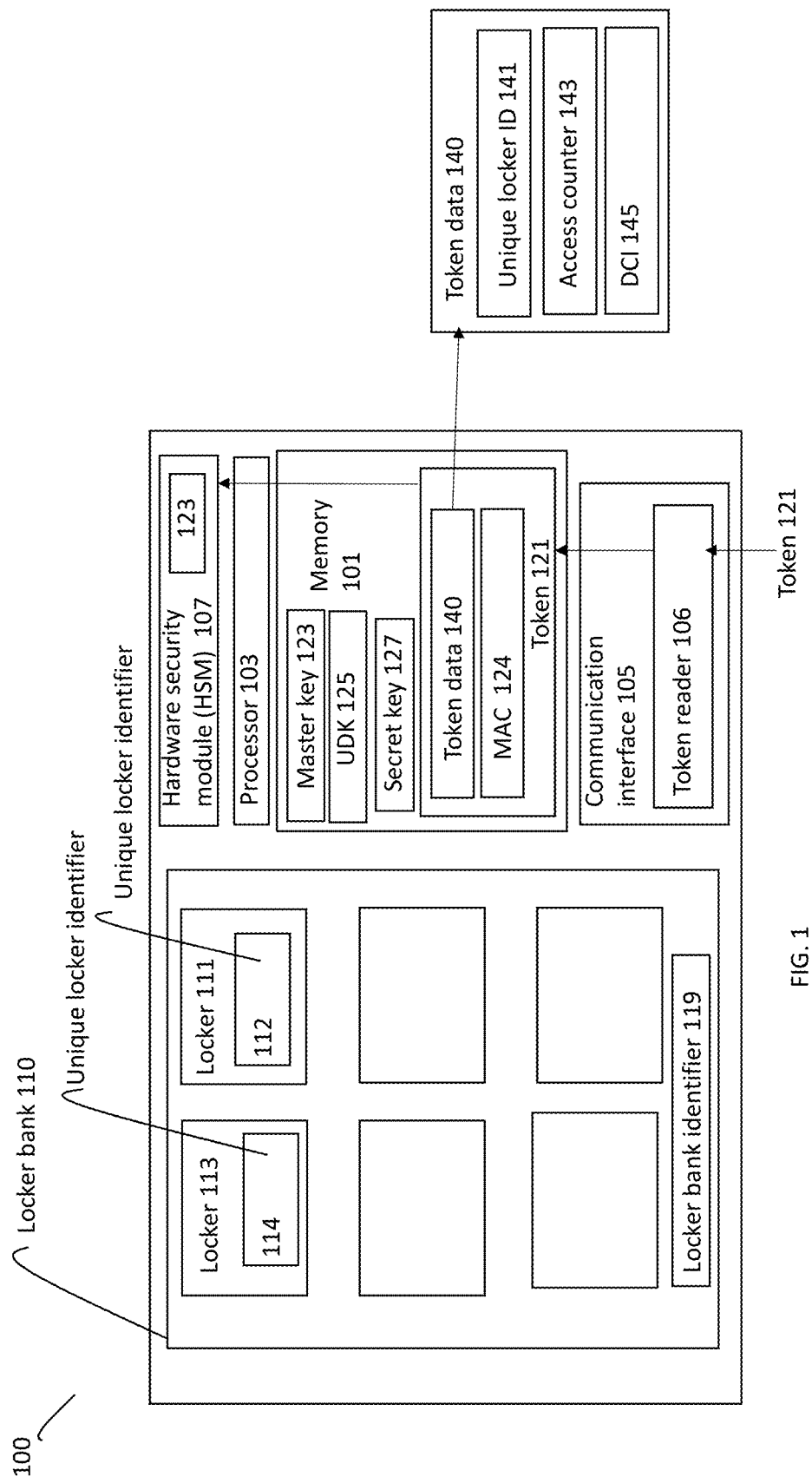
FIG. 1 is a block diagram of a locker system to provide secure access to a locker based on a token including a message authentication code (MAC), according to some embodiments.

Online purchase of goods and products has become a routine of daily lives. It is important to ensure that products bought and sold online successfully arrive in the buyer's hands. Oftentimes, customers purchase products online and receive the products at their homes by postal mail or courier, which may have various drawbacks. For example, a passerby may steal packages ordered online and left outside of a home by a courier. Also, certain goods (e.g., food) may be damaged if left outside a home.

A locker system can be used to deliver products and goods in a more secure way, which can be applicable in a commercial transaction or non-commercial transaction. Secure access to a locker in a locker system can be a challenge. Some locker systems may be networked, and can have a screen and a user interface to allow a user to enter a locker code given to the user by an online shopping application. However, such a simple locker code may be vulnerable to security attack so that someone else can pick up the products in the locker.

Embodiments herein can provide mechanisms with increased security for accessing a locker system. A user can purchase some products online or in person, and pick up the products from a locker system. A one-time user cryptographic token can be created in response to the delivery of the products to a specific locker of the locker system. A token may be viewed as a passcode, a password, a code, a tag, or the like. Tokens can be used to unlock a locker. In embodiments, the tokens have a structure to include various specific contents that make the token more secure than some other alternatives. The token can contain a locker address, time duration of validity, and a counter to avoid reuse, which all together can be referred to as token data used to identify the locker. In addition, the token can also include a message authentication code (MAC) to authenticate the token data. The MAC can be generated using a secret key. The secret key can be obtained based on a unique derivation key (UDK) associated with a master key. The specific content of the token in embodiments presented herein and the design of the secret keys to generate the MAC can increase the security of the token, hence improving the security to access the locker system.

The token can be transmitted to a user in various ways. In some embodiments, the token can be transmitted to the user's mobile device, where the token can be presented to the locker system via host card emulation. In some other embodiments, the token can be recorded to a near field communication (NFC) tag for reading by the locker system.

The token can also be printed as a bar or a Quick Response (QR) code for scanning by the locker system. The use of the token can enable the locker system to scan, read, or receive the token in a contactless way, which can be a great advantage for health concerns, such as during a pandemic time. The locker system can validate the token based on the MAC and the various security keys, and unlock a specific locker if the token is valid. The validity counter for the locker is incremented so that the same token cannot be reused.

Embodiments herein can work without the locker system being networked. A locker system that is not networked can reduce the design cost for the locker system. In another embodiment when the locker system is networked, the token can be sent from a server and associated with a user identifier. The user can provide the user identifier to the locker system, which can be transmitted to a user identification authentication system to be authenticated. Once the user identifier is authenticated, a token associated with the user identifier and a transaction order can then be sent to the locker system via the network, where the token can open the specific locker in the locker system.

FIG. 1 is a block diagram of a locker system 100 to provide secure access to a locker based on a token including a MAC, according to some embodiments. It is to be understood that there may be more or fewer components included in locker system 100. Further, it is to be understood that one or more of the devices and components within locker system 100 may include additional and/or varying features from the description below, and may include any devices and components that one having ordinary skill in the art would consider and/or refer to as providing secure access to a locker based on a token including a MAC.

In some embodiments, locker system 100 can be installed in various places, including in malls, airports, in separate stores or buildings, along the street, or outside in parks or other public areas. The actual look and size of the locker system can vary.

In some embodiments, locker system 100 can include one or more locker banks, e.g., locker bank 110. Descriptions below are provided for locker bank 110, which can be applicable to any other locker bank of locker system 100. Locker bank 110 can be identified by a unique locker bank identifier 119. Accordingly, locker bank identifier 119 is assigned to locker bank 110, and another locker bank of locker system 100 can have a locker bank identifier different from locker bank identifier 119. Locker bank 110 can include multiple lockers such as a locker 111 and a locker 113. Locker 111 and locker 113 can be in various sizes. Each locker in a locker bank can be identified by a unique locker identifier. Locker 111 has a locker identifier 112, and locker 113 has a locker identifier 114, where locker identifier 112 is different from locker identifier 114.

In some embodiments, locker system 100 can include a memory 101, a communication interface 105, and a processor 103 coupled to communication interface 105 and memory 101. Memory 101 can store a master key 123. Communication interface 105 can include a token reader 106, which can read or receive a token 121. Token 121 can be received from, for example, a mobile device provided by the user, a physical token holder provided by the user, or a near field communication tag provided by the user. In some embodiments, token 121 can be received from a user's mobile device, where token 121 can be presented to locker system 100 or token reader 106 via host card emulation. In some other embodiments, token 121 can be recorded to a near field communication (NFC) tag for reading by token reader 106. Token 121 can also be printed as a bar or a QR code for scanning by token reader 106.

In some embodiments, processor 103 can be configured to receive token 121 through communication interface 105 to unlock a locker, e.g., locker 111. Token 121 can include token data 140, and a MAC 124 to authenticate token data 140. Token data 140 can include at least the unique locker identifier 141 for the locker. When token data 140 indicates locker 111 is used, the unique locker identifier 141 included in token data 140 will be the same value of locker identifier 112. Token data 140 can further include an access counter 143 to record a number of accesses to the locker, or a date code interval (DCI) 145. DCI 145 can include a validation time duration, or other parameters related to time such as date, day, or time.

In some embodiments, MAC 124 can be generated using a secret key 127. In cryptography, MAC 124 can be a short piece of information used to authenticate token data 140 to confirm that token data 140 came from the stated sender (its authenticity) and has not been changed. MAC 124 protects data integrity for token data 140, as well as its authenticity, by allowing locker system 100 (who also possess the secret key) to detect any changes to token data 140.

In some embodiments, secret key 127 can be obtained based on a unique derivation key (UDK) 125 associated with master key 123. UDK 125 can be generated based on master key 123 and unique locker bank identifier 119. In some embodiments, secret key 127 can be a session key generated based on UDK 125 and a transaction counter, with details shown in FIG. 2B. MAC 124 can be a keyed-hash message authentication code (HMAC) generated by a cryptographic hash function, a one-time MAC generated by a k-independent hashing function, or a counter with cipher block chaining message authentication code.

In some embodiments, processor 103 can be configured to determine whether token 121 is valid based on token data 140, MAC 124, and secret key 127. In response to a determination that token 121 is valid, processor 103 can be configured to send a signal to unlock the locker.

In some embodiments, some functions performed by processor 103 can be performed by a special or a custom hardware, e.g., hardware security module (HSM) 107. For example, memory 101 can be included in HSM 107. HSM 107 can be a physical computing device that safeguards and manages digital keys, such as secret key 127, master key 123, and UDK 125, and performs encryption and decryption functions for digital signatures, strong authentication and other cryptographic functions. HSM 107 can be implemented as a plug-in card or an external device that attaches directly to a computer or a computing device for locker system 100. HSM 107 can include one or more secure cryptoprocessor chips.

Figure 2A:
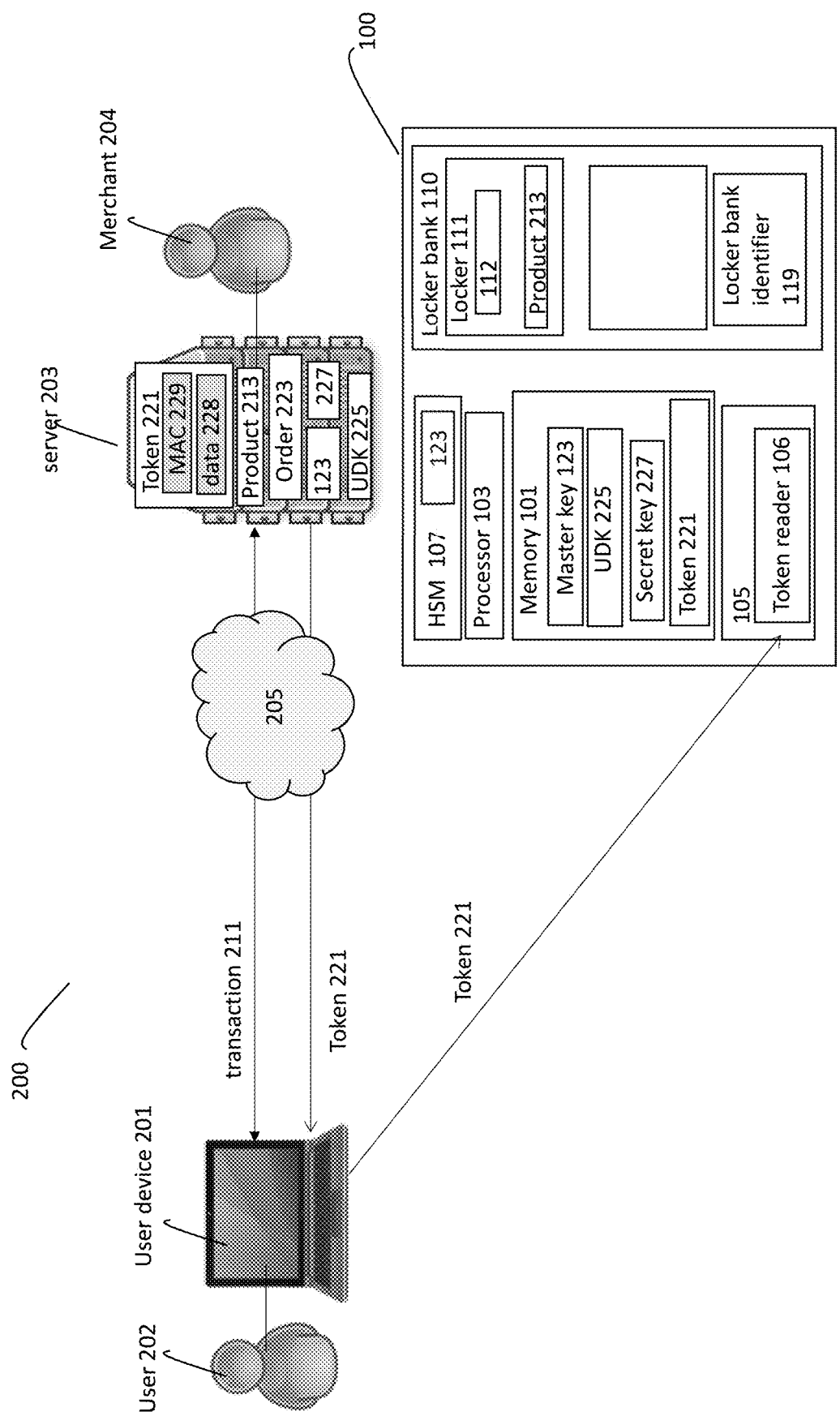
FIGS. 2A-2B illustrate an example system to generate and deliver a token to access a locker of a locker system to deliver products in a transaction, according to some embodiments.
Figure 3:
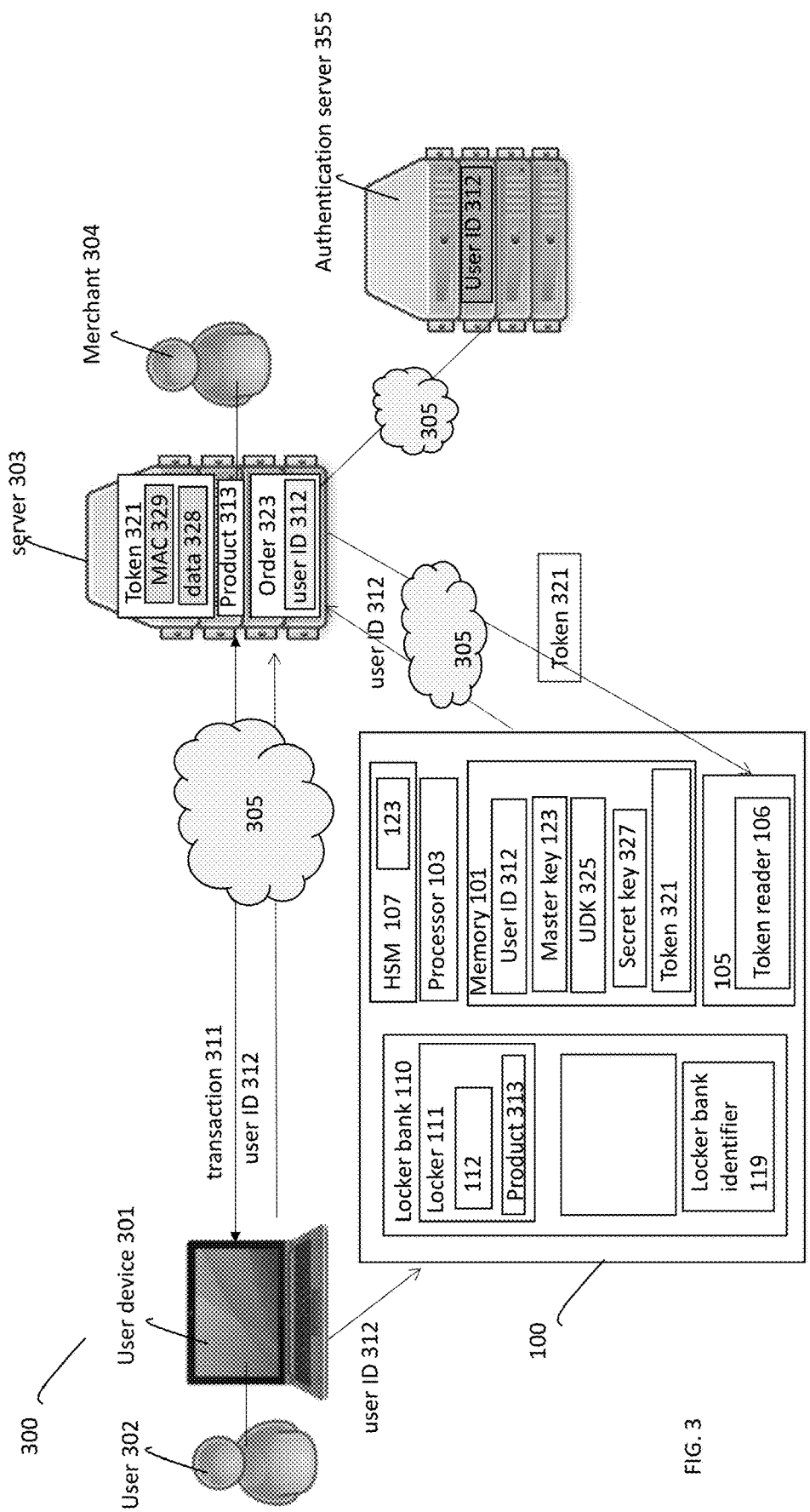
FIG. 3 illustrates another example system to generate and deliver a token to access a locker of a locker system to deliver products in a transaction, according to some embodiments.

In some embodiments, locker system 100 can also include a user interface console, configured to accept user inputs to open lockers, which is not shown. In some embodiments, as shown in FIG. 2A, locker system 100 is a standalone system without a network connection. In some embodiments, locker system 100 can also be connected to a server, as shown in FIG. 3.

Figure 2B:
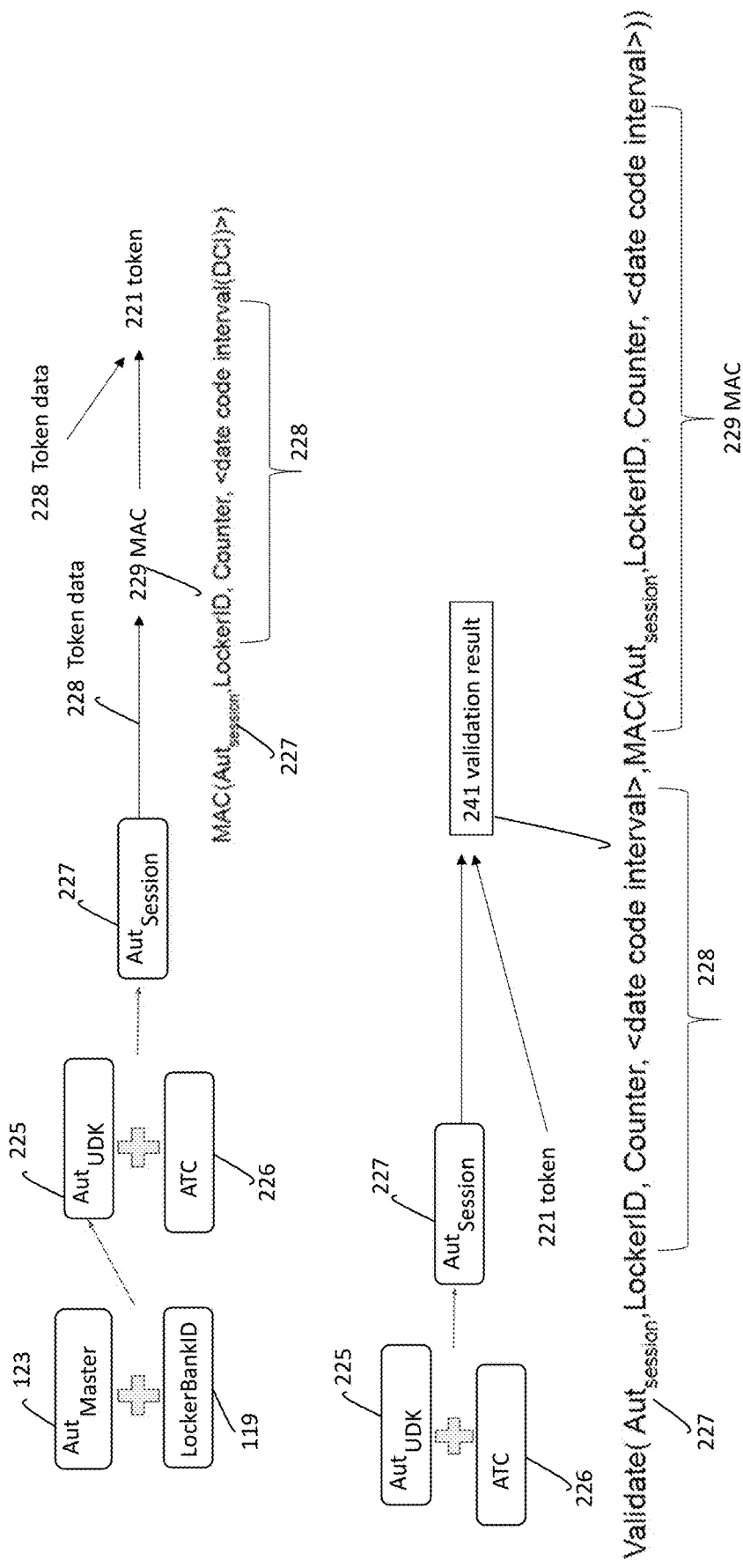

FIGS. 2A-2B illustrate an example system 200 to generate and deliver a token 221 to access a locker of a locker system to deliver products in a transaction, according to some embodiments. System 200 includes locker system 100, where token 221 can be delivered to locker system 100 to unlock locker 111.

In some embodiments, system 200 can include a user device 201, a server 203, and locker system 100. A user 202 may perform a transaction 211, e.g., to purchase products, with a merchant 204, by using user device 201 in communication with server 203, where server 203 may be managed by merchant 204. User device 201 and server 203 may be communicatively coupled by a network 205. In some embodiments, user 202 may perform transaction 211 to generate an order 223 saved on server 203 for a product 213. Token 221 can be used for user 202 to pick up product 213 placed in locker system 100.

In some embodiments, user 202 may use device 201, e.g., a home computer, to shop on a shopping website served by server 203. In detail, user 202 may perform online shopping on a website displayed on user device 201, where the website may be provided by server 203 in communication with user device 201. User 202 may have selected a group of items, e.g., product 213, to be included in order 223, generate order 223, provide an amount to be paid to merchant 204 for order 223, and complete order 223 at a checkout time. Order 223 may be saved by server 203. Server 203 may indicate to user 202 the pickup location, e.g., the location of locker system 100. Server 203 may further coordinate the delivery of product 213 to locker system 100 to place product 213 into locker 111. Furthermore, server 203 can generate and deliver token 221 to user 202, where token 221 may include a token data 228 and a MAC 229. MAC 229 may be generated based on master key 123, a secret key 227, a UDK 225, and/or token data 228. Token data 228 may include information related to the location of locker system 100, a locker number such as the locker identifier 112, and information for the order 223. Information for order 223 may include the items included in order 223, the time and location order 223 is generated, the amount paid for order 223, and other related information.

In some embodiments, as shown in FIG. 2B, token 221 is generated by server 203. In detail, token 221 can be generated by applying secret key 227 to token data 228 to generate MAC 229. Token 221 can include token data 228 and MAC 229, where MAC 229 is used to authenticate token data 228. MAC 229 may be, for example and without limitation, a keyed-hash message authentication code (HMAC) generated by a cryptographic hash function, a one-time MAC generated by a k-independent hashing function, or a counter with cipher block chaining message authentication code.

In some embodiments, secret key 227 may be a session key generated based on a UDK 225 and a transaction counter 226. UDK 225 can be generated based on master key 123 and unique locker bank identifier 119. Transaction counter 226 can record the number of transactions server 203 has served, which can be a dynamic number. Locker bank identifier 119 is defined for locker bank 110, which is also dynamically assigned based on the delivery of product 213. Hence, the use of locker bank identifier 119 and transaction counter 226 can further increase the security of secret key 227. Server 203 can save various security keys, including master key 123, UDK 225, secret key 227, and related information such as locker bank identifier 119, transaction counter 226, and other related information.

In some embodiments, after transaction 211 is performed, e.g., payment received from user 202, product 213 may be delivered to locker system 100 to be stored in locker 111 for user 202 to pick up. In order to facilitate user 202 to pick up product 213, token 221 can be transmitted from server 203 to user device 201 (which may be the same as or different from the user device used to perform transaction 211) or user 202.

In some embodiments, locker system 100 can be a stand-alone system without a network connection with server 203.

User 202 can receive token 221 from server 203, and present token 221 to locker system 100 to pick up product 213. Locker system 100 can receive token 221 from user 202 or user device 201. Locker system 100 can validate token 221. Locker system 100 can validate token 221 to produce validation result 241. As shown in FIG. 2B, when validation result 241 shows token 221 is valid, locker system 100 can select a locker based on token 221, and further open the locker identified by token 221 so that user 202 can pick up product 213 stored in the locker.

In some embodiments, as shown in FIG. 2B, locker system 100 can also generate and store secret key 227, which is the same as secret key 227 used by server 203. Locker system 100 can follow the same procedure to generate secret key 227, e.g., using UDK 225 and transaction counter 226. Various key management processes and operations can be performed to maintain master key 123, UDK 225, secret key 227, and related information such as locker bank identifier 119, transaction counter 226, so that both server 203 and locker system 100 can have the same keys even when they are not networked. For example, master key 123, UDK 225, secret key 227 can be programmed into HSM 107.

In some embodiments, user device 201 can be a wireless communication device, a smart phone, a laptop, a tablet, a personal assistant, a monitor, a wearable device, an Internet of Thing (IoT) device, a mobile station, a subscriber station, a remote terminal, a wireless terminal, or a user device. In some other examples, user device 201 can be a desktop workstation, a server, and/or embedded system, communicatively coupled to server 203 by wired lines, or any combination thereof. User device 201 can also be configured to operate based on a wide variety of wireless communication techniques. These techniques can include, but are not limited to, techniques based on 3rd Generation Partnership Project (3GPP) standards.

In some examples, user device 201 can include various components, such as a processor, an operating system, a camera, a storage device coupled to the processor. User device 201 can store user data about user 202, device data about user device 201, or other environment data about an environment of user 202 or user device 201.

In some examples, network 205 can include a network formed by some or all of user device 201, server 203, and/or some other devices not shown. For example, network 205 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some examples, server 203 can include a server device (e.g., a host server, a web server, an application server, etc.), a data center device, or a similar device. Server 203 can include a processor, an operating system, server applications operated by the processor, and a storage device coupled to the processor. The processor of server 203 can include one or more central processing units (CPUs), and a programmable device (such as a hardware accelerator or a FPGA).

FIG. 3 illustrates another example system 300 to generate and deliver a token to access a locker of a locker system to deliver products in a transaction, according to some embodiments. System 300 includes locker system 100, where token 321 can be delivered to locker system 100 by a server 303 communicatively coupled to locker system 100 to unlock locker 111.

In some embodiments, system 300 can include a user device 301, a server 303, and locker system 100. A user 302 may perform a transaction 311, e.g., to purchase products, with a merchant 304, by using user device 301 in communication with server 303, where server 303 may be managed by merchant 304. User device 301 and server 303 may be communicatively coupled by a network 305. In some embodiments, user 302 may perform transaction 311 to generate an order 323 saved on server 303 for a product 313.

In some embodiments, during transaction 311, user 302 may provide a user identifier 312 to server 303 so that server 303 may associate order 323 with user identifier 312. Server 303 may save user identifier 312 as a part of order 323. Accordingly, server 303 may not deliver a token to user 302 for picking up product 313 from locker system 100. Instead, user 302 may pick up product 313 from locker system 100 using user identifier 312.

In some embodiments, server 303 may indicate to user 302 the pickup location, e.g., the location of locker system 100. Server 303 may further coordinate the delivery of product 313 to locker system 100 to place product 313 into locker 111 for user 302 to pick up.

In some embodiments, user 302 may pick up product 313 using user identifier 312. Token reader 106 of locker system 100 may read or receive user identifier 312. User identifier 312 may be a specially generated identifier generated by server 303. In some embodiments, user identifier 312 may be an identifier issued by a third party, such as a driver's license. Afterwards, locker system 100 may transmit user identifier 312 to server 303 through network 305 for authentication. Server 303 may authenticate user identifier 312. In some other embodiments, server 303 may invoke an authentication server 355 coupled to server 303 by network 305 to perform operations to authenticate user identifier 312.

In some embodiments, after user identifier 312 has been authenticated by server 303 or authentication server 355, server 303 may select order 323 to match user identifier 312. In this way, server 303 may determine product 313 user 302 has purchased or ordered as indicated by order 323. After identifying order 323, server 303 may identify locker 111 where product 313 is placed.

In some embodiments, after identifying order 323, product 313, and locker 111, server 303 can generate a token 321 to be delivered to lock system 100 to unlock locker 111. Server 303 can generate and deliver token 321 to token communication interface 105 of locker system 100, instead of issuing the token to user 302. Token 321 may include a token data 328 and a MAC 329. MAC 329 may be generated based on master key 123, a UDK 325, a secret key 327, and token data 328. Token data 328 may include information related to the location of locker system 100, locker number such as the locker identifier 112, and information for the order 323. Server 303 may save master key 123, UDK 325, and secret key 327, which are not shown. Master key 123, UDK 325, and secret key 327 may be similar to master key 123, UDK 225, secret key 227 as shown in FIG. 2B.

In some embodiments, after locker system 100 receives token 321 from server 303, locker system 100 can validate token 321. Locker system 100 can validate token 321 to produce a validation result. When the validation result shows token 321 is valid, locker system 100 can select a locker based on token 321, and further open the locker identified by token 321 so that user 302 can pick up product 213 stored in the locker. On the other hand, when the validation result shows token 321 is invalid, locker system 100 may simply deny access to the locker and user 302 cannot pick up product 313.

Figure 4:
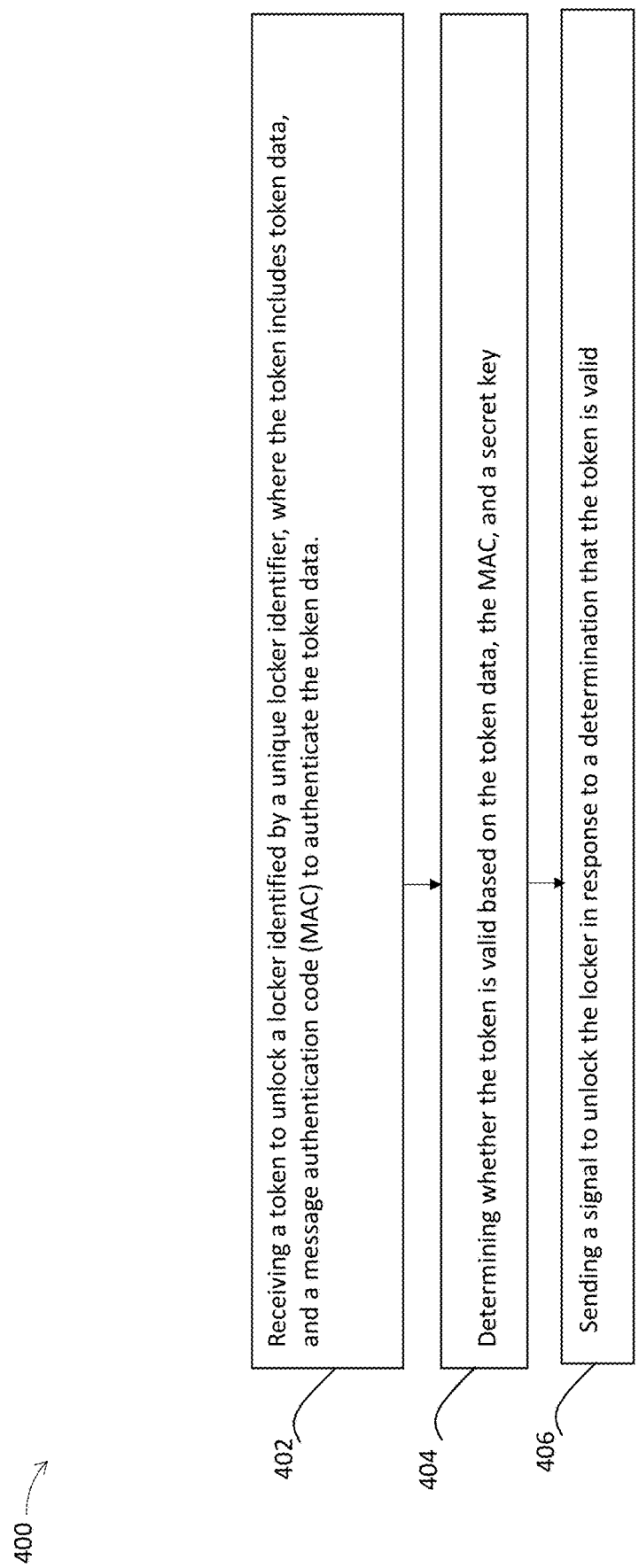
FIG. 4 illustrates an example process for providing secure access to a locker based on a token including a MAC, according to some embodiments.

FIG. 4 illustrates an example process 400 for providing secure access to a locker based on a token including a MAC, according to some embodiments. Process 400 may be referred to as method 400, which can be performed by processor 103 of locker system 100 to provide secure access to a locker based on a token including a MAC.

In 402, a locker system can receive a token to unlock a locker identified by a unique locker identifier, where the token includes token data and a message authentication code (MAC) to authenticate the token data. The MAC can be generated using a secret key obtained based on a UDK associated with a master key, and where the token data includes at least the unique locker identifier. For example, as shown in FIGS. 2A-2B, locker system 100 can receive token 221 to unlock locker 111 identified by a unique locker identifier 112, where token 221 includes token data 228 and MAC 229 to authenticate token data 228. MAC 229 can be generated using secret key 227 obtained based on UDK 225 associated with master key 123, and token data 228 includes at least the unique locker identifier 112.

In 404, the locker system can determine whether the token is valid based on the token data, the MAC, and the secret key. For example, as shown in FIGS. 2A-2B, locker system 100 can determine whether token 221 is valid based on token data 228, MAC 229, and secret key 227.

In 406, the locker system can send a signal to unlock the locker in response to a determination that the token is valid. For example, as shown in FIGS. 2A-2B, locker system 100 can send a signal to unlock locker 111 in response to a determination that token 221 is valid.

Figure 5:
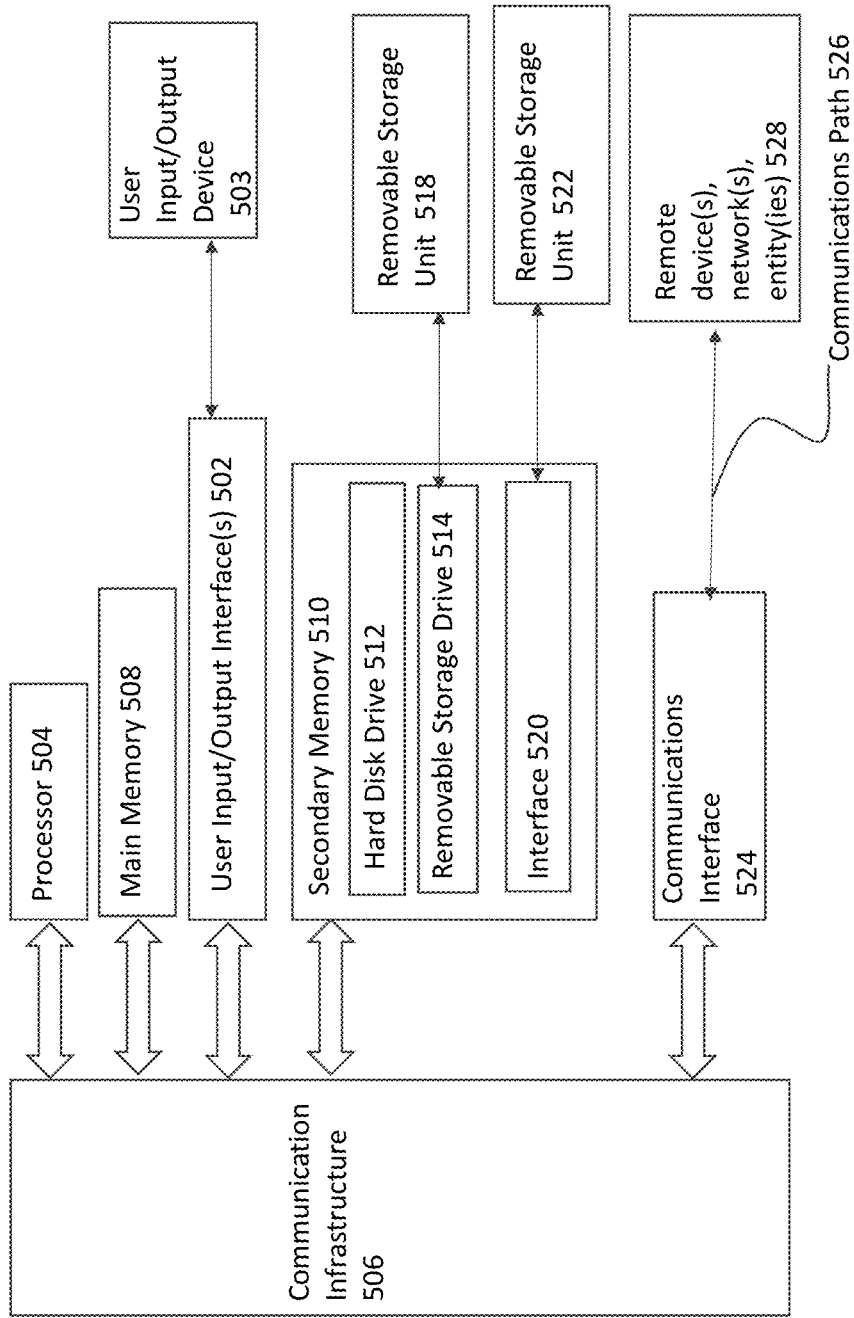
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. In some examples, computer system 500 can be used to implement locker system 100, user device 201, server 203, user device 301, server 303, server 305, as shown in FIGS. 1, 2A, and 3, or operations shown in FIGS. 2B and 4.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein. For example, control logic may cause processor 504 to receive a token to unlock a locker identified by a unique locker identifier, wherein the token includes token data, and a message authentication code (MAC) to authenticate the token data, wherein the MAC is generated using a secret key obtained based on a unique derivation key (UDK) associated with a master key, and wherein the token data includes at least the unique locker identifier; determining whether the token is valid based on the token data, the MAC, and the secret key; and sending a signal to unlock the locker in response to a determination that the token is valid, as shown in FIG. 4.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A locker system, comprising:
a memory configured to store a master key;
a communication interface; and
a processor coupled to the memory and the communication interface, and configured to:
receive a token through the communication interface to unlock a locker identified by a unique locker identifier, wherein the token includes token data, and a message authentication code (MAC) to authenticate the token data, wherein the MAC is generated using a secret key obtained based on a unique derivation key (UDK) associated with the master key, and wherein the token data includes at least the unique locker identifier, wherein the locker is located in a locker bank identified by a unique locker bank identifier, and wherein the UDK is generated based on the master key and the unique locker bank identifier, and the secret key is a session key generated based on the UDK and a transaction counter;
determine whether the token is valid based on the token data, the MAC, and the secret key; and
send a signal to unlock the locker in response to a determination that the token is valid.

2. The locker system of claim 1, wherein the token data further includes at least one of an access counter to record a number of accesses to the locker or a date code interval (DCI).

3. The locker system of claim 1, further comprising:
a plurality of lockers including the locker, wherein the locker is a first locker, the unique locker identifier is a first locker identifier, and the plurality of lockers further include a second locker having a second locker identifier that is different from the first locker identifier.

4. The locker system of claim 1, wherein the MAC is a keyed-hash message authentication code (HMAC) generated by a cryptographic hash function, a one-time MAC generated by a k-independent hashing function, or a counter with cipher block chaining message authentication code.

5. The locker system of claim 1, wherein the memory storing the master key is provided in a hardware security module.

6. The locker system of claim 1, wherein the communication interface includes a token reader configured to read the token provided by a user in a contactless way.

7. The locker system of claim 6, wherein the token is received from a mobile device provided by the user, a physical token holder provided by the user, or a near field communication tag provided by the user.

8. The locker system of claim 1, wherein the processor is further configured to:
receive through the communication interface a user identifier associated with a user;
send the user identifier to a server to authenticate the user; and
receive the token from the server after the server authenticates the user identifier.

9. The locker system of claim 8, wherein the user identifier is associated with a purchase order placed by the user through the server, and the server authenticates the user identifier using an independent authentication system.

10. A computer-implemented method, the method comprising:
receiving a token to unlock a locker identified by a unique locker identifier, wherein the token includes token data, and a message authentication code (MAC) to authenticate the token data, wherein the MAC is generated using a secret key obtained based on a unique derivation key (UDK) associated with a master key, and wherein the token data includes at least the unique locker identifier, wherein the locker is located in a locker bank identified by a unique locker bank identifier, and wherein the UDK is generated based on the master key and the unique locker bank identifier, and the secret key is a session key generated based on the UDK and a transaction counter;

determining whether the token is valid based on the token data, the MAC, and the secret key; and sending a signal to unlock the locker in response to a determination that the token is valid.

11. The computer-implemented method of claim 10, wherein the token data further includes at least one of an access counter to record a number of accesses to the locker or a date code interval (DCI).

12. The computer-implemented method of claim 10, wherein the receiving the token comprises:

receiving a user identifier associated with a user;

sending the user identifier to a server to authenticate the user; and receiving the token from the server after the server authenticates the user identifier.

13. The computer-implemented method of claim 12, wherein the user identifier is associated with a purchase order placed by the user through the server, and the server authenticates the user identifier using an independent authentication system.

14. A non-transitory computer-readable medium storing instructions, the instructions, when executed by a processor, cause the processor to perform operations comprising:

receiving a token to unlock a locker identified by a unique locker identifier, wherein the token includes token data, and a message authentication code (MAC) to authenticate the token data, wherein the MAC is generated using a secret key obtained based on a unique derivation key (UDK) associated with a master key, and wherein the token data includes at least the unique locker identifier, wherein the locker is located in a locker bank identified by a unique locker bank identifier, and wherein the UDK is generated based on the master key and the unique locker bank identifier, and the secret key is a session key generated based on the UDK and a transaction counter;

determining whether the token is valid based on the token data, the MAC, and the secret key; and sending a signal to unlock the locker in response to a determination that the token is valid.

15. The non-transitory computer-readable medium of claim 14, wherein the receiving the token comprises:

receiving a user identifier associated with a user;

sending the user identifier to a server to authenticate the user; and receiving the token from the server after the server authenticates the user identifier.

* * * * *